United States Patent
Kohtani et al.

(10) Patent No.: US 7,844,138 B2
(45) Date of Patent: Nov. 30, 2010

(54) HISTORY CONTROL APPARATUS

(75) Inventors: Yoshihide Kohtani, Kanagawa (JP); Ayumi Segi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1202 days.

(21) Appl. No.: 11/451,430

(22) Filed: Jun. 13, 2006

(65) Prior Publication Data

US 2007/0140568 A1 Jun. 21, 2007

(30) Foreign Application Priority Data

Dec. 21, 2005 (JP) ............................. 2005-368118

(51) Int. Cl.
*G06K 9/54* (2006.01)
(52) U.S. Cl. .................................... 382/305
(58) Field of Classification Search ................. 382/305, 382/181, 209, 218, 224, 291, 229; 707/1–10, 707/705–708, 713, 721
See application file for complete search history.

(56) References Cited

U.S. PATENT DOCUMENTS

| | | | | |
|---|---|---|---|---|
| 5,457,794 A | * | 10/1995 | Azumatani et al. ............. 707/2 |
| 5,757,983 A | * | 5/1998 | Kawaguchi et al. ......... 382/305 |
| 5,854,860 A | * | 12/1998 | Kobayashi ................... 382/305 |
| 6,055,530 A | * | 4/2000 | Sato ............................... 707/3 |
| 6,438,566 B1 | * | 8/2002 | Okuno et al. ................ 715/233 |
| 6,556,713 B2 | * | 4/2003 | Kobayashi et al. .......... 382/224 |
| 7,142,716 B2 | * | 11/2006 | Katsuyama et al. ......... 382/190 |
| 2002/0093678 A1 | * | 7/2002 | Skidgel et al. ............. 358/1.15 |
| 2005/0108202 A1 | * | 5/2005 | Nishikubo ...................... 707/3 |

FOREIGN PATENT DOCUMENTS

JP A-11-328200 11/1999
JP A 2002-016788 1/2002

* cited by examiner

*Primary Examiner*—Daniel G Mariam
(74) *Attorney, Agent, or Firm*—Oliff & Berridge, PLC

(57) ABSTRACT

A history management apparatus includes: a detection unit that detects a character or a word included in image data which is processed in an image processing apparatus; and a storage unit that stores information to specify a detection position of the detected character or word in the image data and the image data in association with each other. The stored information is provided to an image data searching process using the character or the word and the detecting position as search conditions.

10 Claims, 6 Drawing Sheets

FIG. 3A
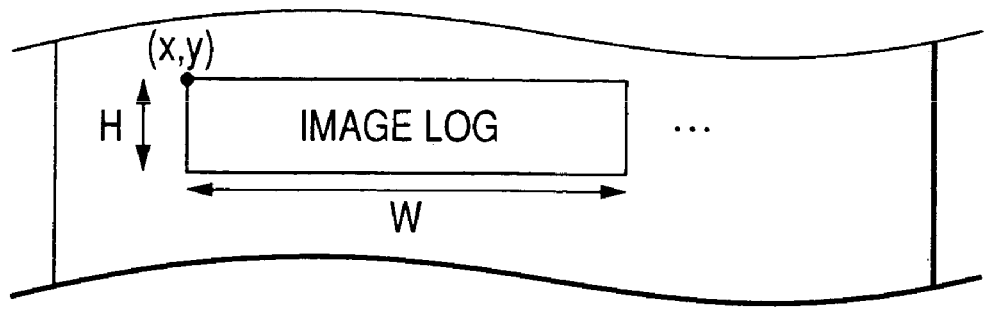
FIG. 3B
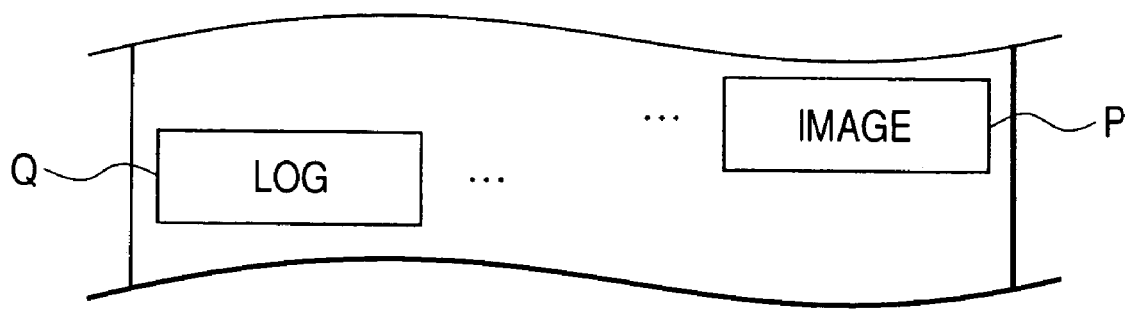
FIG. 3C
| UPPER LEFT COORDINATES | WIDTH | HEIGHT | DIVISIONAL |
|---|---|---|---|
| Xp,Yp | Wp | Hp | DIVISIONAL |
| Xq,Yq | Wq | Hq | NONE |

WORD FUNDAMENTAL INFORMATION:

| CHARACTER STRING INFORMATION | NUMBER OF TIMES OF APPEARANCE |
|---|---|
| "IMAGE LOG" | 3 |

WORD POSITION INFORMATION:

| UPPER LEFT COORDINATES | WIDTH | HEIGHT | DIVISIONAL |
|---|---|---|---|
| Xa, Ya | Wa | Ha | NONE |
| Xb, Yb | Wb | Hb | NONE |
| Xc, Yc | Wc | Hc | DIVISIONAL |
| Xd, Yd | Wd | Hd | NONE |

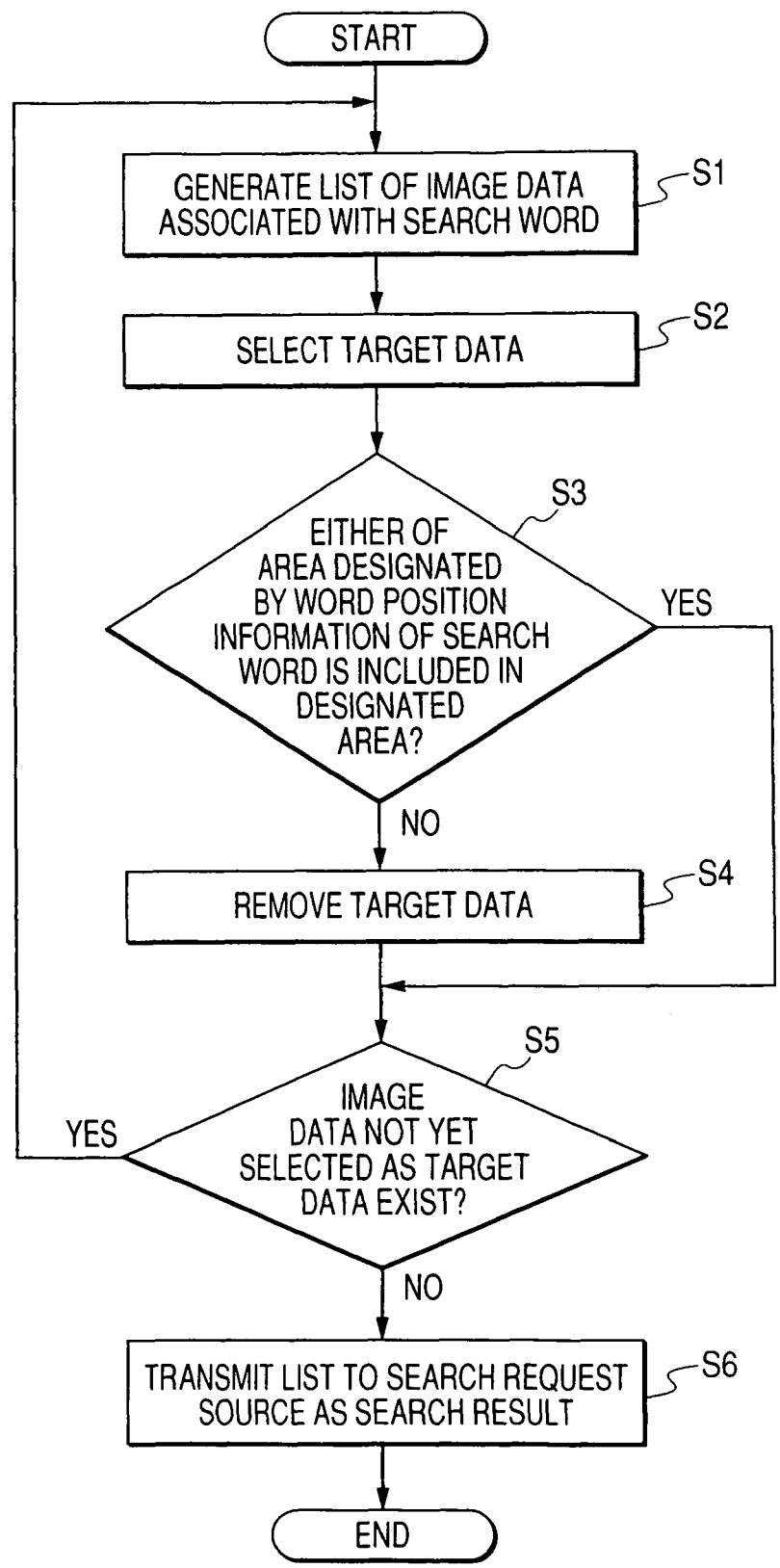

HISTORY CONTROL APPARATUS

BACKGROUND

1. Technical Field

The present invention relates to a history control apparatus for recording image data as a history, which has been processed in an image processing apparatus such as a copy machine or a printer.

2. Related Art

In recent years, a technology has arisen that stores a history of image data copied by a copy machine or the like, thereby making it possible to track a date of forming specified image data or a person who instructed to form it. Further, some technologies have also arisen that extract character string information included in the image data using an optical character recognition (OCR) process or the like and store the information in association with the image data, thereby making it possible to search the image data using a keyword.

SUMMARY

According to an aspect of the present invention, a history management apparatus includes: a detection unit that detects a character or a word included in image data which is processed in an image processing apparatus; and a storage unit that stores information to specify a detection position of the detected character or word in the image data and the image data in association with each other. The stored information is provided to an image data searching process using the character or the word and the detecting position as search conditions.

BRIEF DESCRIPTION OF THE DRAWINGS

Embodiment of the present invention will be described in detail based on the following figures, wherein:

FIGS. 3A to 3C are explanatory diagrams showing an example of generating the word position information by the history control apparatus according to the embodiment of the invention

FIG. 6 is a flowchart showing an example of the search process of a history control apparatus according to the embodiment of the invention.

DETAILED DESCRIPTION OF THE INVENTION

Figure 1:
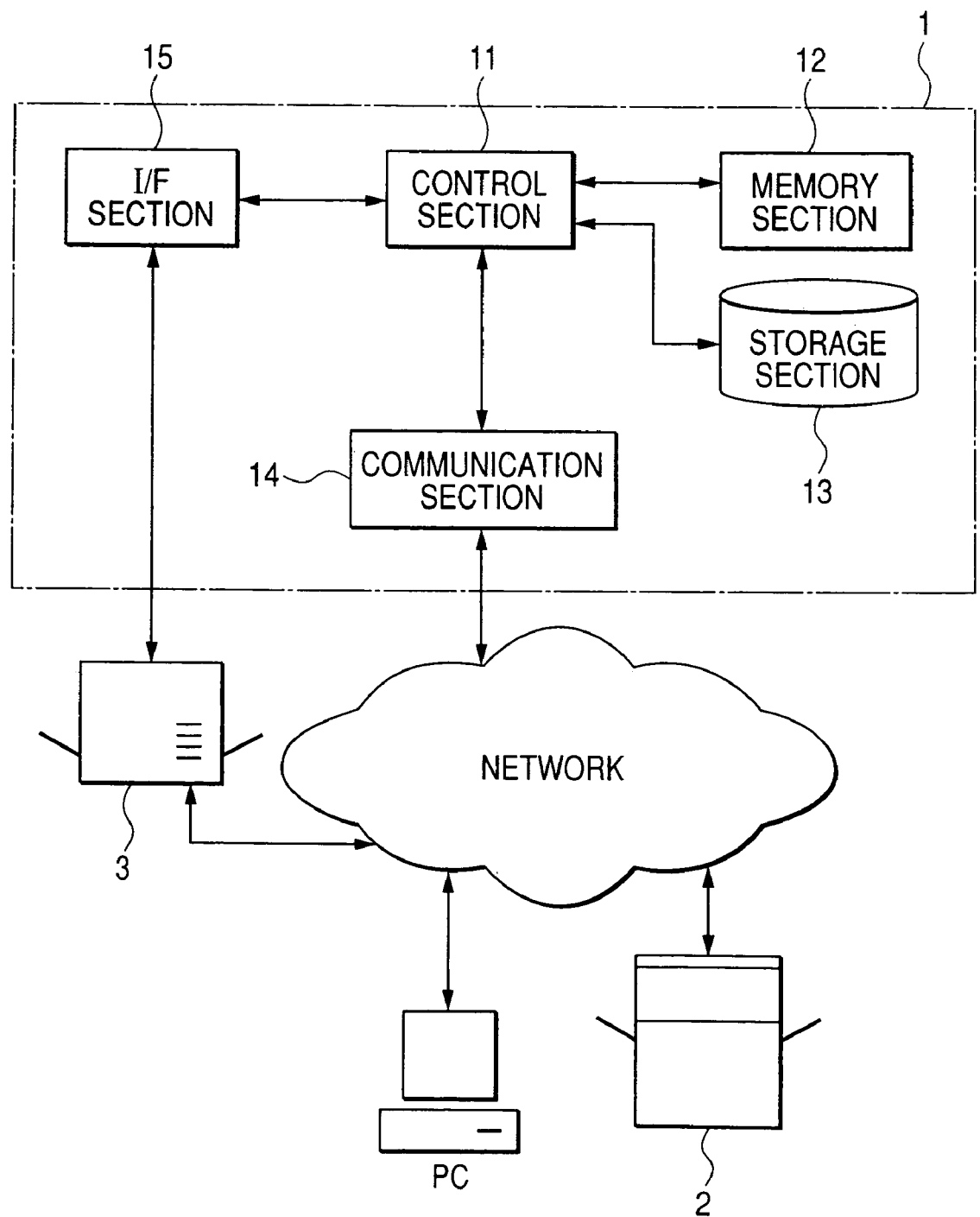
FIG. 1 is a block diagram showing the configuration and a connection example of a history control apparatus according to an embodiment of the invention.

An embodiment of the present invention will now be explained with reference to the accompanying drawings. A history control apparatus 1 according to the embodiment of the invention is, as shown in FIG. 1, connected to an image processing apparatus such as a copy machine 2 or a printer 3. The history control apparatus 1 of the present embodiment is configured including a control section 11, a memory section 12, a storage section 13, a communication section 14, and an interface (I/F) section 15 as shown in FIG. 1.

The control section 11 is a CPU or the like, and operates in accordance with a program stored in the memory section 12. The control section 11 receives image data, which was an object of a process in the copy machine 2 or the printer 3, and additional information such as information for specifying the user who required the process of the image data, and then stores history information including such information in the storage section 13.

Further, the control section 11, in response to an instruction for searching the history information, performs a searching operation for searching the history information stored in the storage section 13 to present the search result. Each operation of the control section 11 will be described later in detail.

The memory section 12 is configured including a memory element such as a RAM or a ROM. The memory section 12 stores a program for the control section 11 to execute. Further, the memory section 12 also operates as a work memory of the control section 11. The storage section 13 is, for example, a hard disc drive, and stores the history information in accordance with an instruction input from the control section 11.

The communication section 14 is, for example, a network card, and transmits data to a designated destination via a network in accordance with an instruction input from the control section 11. Further, the communication section 14 receives data arriving via the network, and output it to the control section 11.

The I/F section 15 is, for example, a serial bus interface such as Universal Serial Bus (USB) interface, and is connected to the printer 3. The I/F section 15 receives the image data, which was the object of the process in the printer 3, and outputs it to the control section 11.

The copy machine 2 is connected to the history control apparatus 1 via the network. The copy machine 2, in response to a copy instruction by the user, transmits the image data read out in accordance with the copy instruction to the history control apparatus 1. Note that in this case, the copy machine 2 can identify the user who issued the copy instruction by requiring the user to input his or her name or password, and transmit the information (e.g., the user name) for identifying the user, obtained by this identification process to the history control apparatus 1 together with the image data.

The printer 3 is connected to the history control apparatus 1 also via the serial bus interface or the like, prints out image data received from a personal computer (PC) and so on connected via the network, and further transmits to the history control apparatus 1 the image data (the image data which was the object of the process), which the printer printed out, and additional information such as the user name received from the PC.

Figure 2:
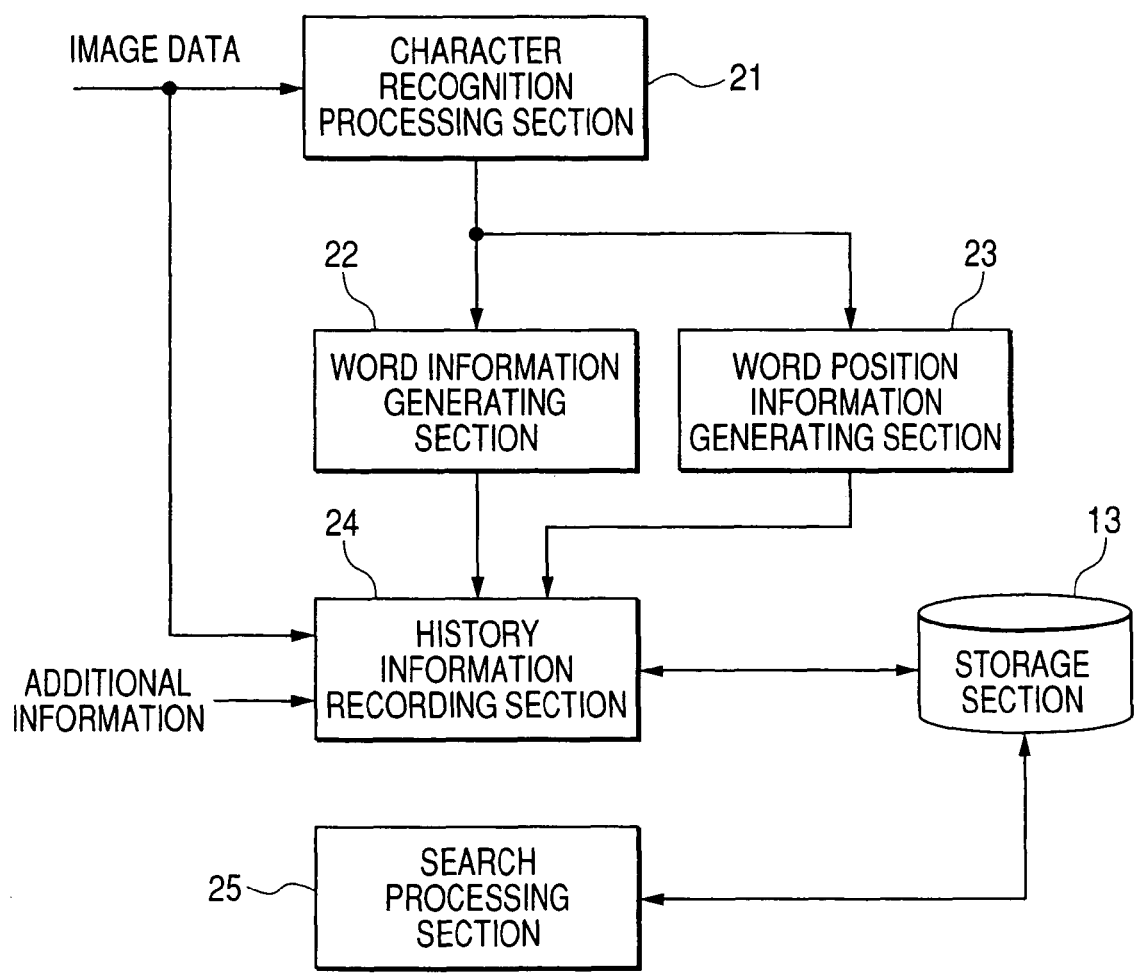
FIG. 2 is a functional block diagram of the history control apparatus according to the embodiment of the invention.

Contents of the operations of the control section 11 will hereinafter be explained. The process executed by the control section 11 of the history control apparatus 1 is functionally configured including a character recognition processing section 21, a word information generating section 22, a word position information generating section 23, a history information recording section 24, and a search processing section 25 as shown in FIG. 2.

The character recognition processing section 21 receives the image data and the additional information from the image processing apparatus such as the copy machine 2 or the printer 3, and performs the character recognition process taking these as the objects of the process. If the received image data is bitmap image data, the character recognition processing section 21 extracts character string data included therein by performing an optical character recognition process. Further, if the received image data is data described by a PDL, the character recognition processing section 21 extracts the character string from the PDL data.

Further, the word information generating section 22 generates word information by performing a morphological analysis process or an N-gram process on the character data extracted by the character recognition processing section 21. For example, in the case with the morphological analysis process, it is divided by a predetermined word, and each of the words is handled as the word information. On the contrary, in the case with the N-gram process, the word information is generated by sequentially extracting N characters from the i-th (i=1, 2 . . . ) character.

The word position information generating section 23 generates position information representing the position in the image data where the generated word information is included. Here, the position information is expressed by a value in a coordination system in which the X axis and the Y axis are respectively arranged in right and lower directions with the origin (0, 0) at, for example, the upper left corner of the image data. And, as a specific example, the coordinate value (x, y) of the upper left corner of the rectangular area surrounding the word, and the width W and the height H of the rectangular area are to be detected as shown in FIG. 3A. The position information can be set in accordance with the coordinate information of the rectangle set in the character recognition process and surrounding the characters, which are the objects of the recognition, in the case with the optical character recognition. Or, in the case with the PDL data, it can be set in accordance with the information for designating the disposing position of the characters.

Note that in the case in which the character string is arranged in a number of lines, the rectangular area can be defined by every line. In this case, if the character string of the word information spans more than one line, the rectangular area surrounding the portion of the character string is defined in each of the lines.

For example, as shown in FIG. 3B, regarding the word "IMAGELOG", if a part "IMAGE" is positioned in the end of the preceding line, and a part "LOG" is positioned in the beginning of the succeeding line, then the rectangular area P (with the upper left coordinate value (xp, yp), the width Wp, and the height Hp) surrounding the part "IMAGE" and the rectangular area Q (with the upper left coordinate value (xq, yq), the width Wq, the height Hq) surrounding the part "LOG" are defined in the respective lines. And, the information representing that the rectangular areas are divided sections is associated with at least one of the rectangular areas. For example, in the example of FIG. 3B, the information of the rectangular area representing the part "IMAGE" is associated with a flag "divisional," and the information of the succeeding rectangular area representing the part "LOG" is generated continuously (see FIG. 3C). Namely, in the present embodiment, pieces the information of the plural divisional rectangular areas are recorded continuously, and the divisional flag indicates that the information of the rectangular area recorded next is one relating to the divisional area.

Figures 4, 5:
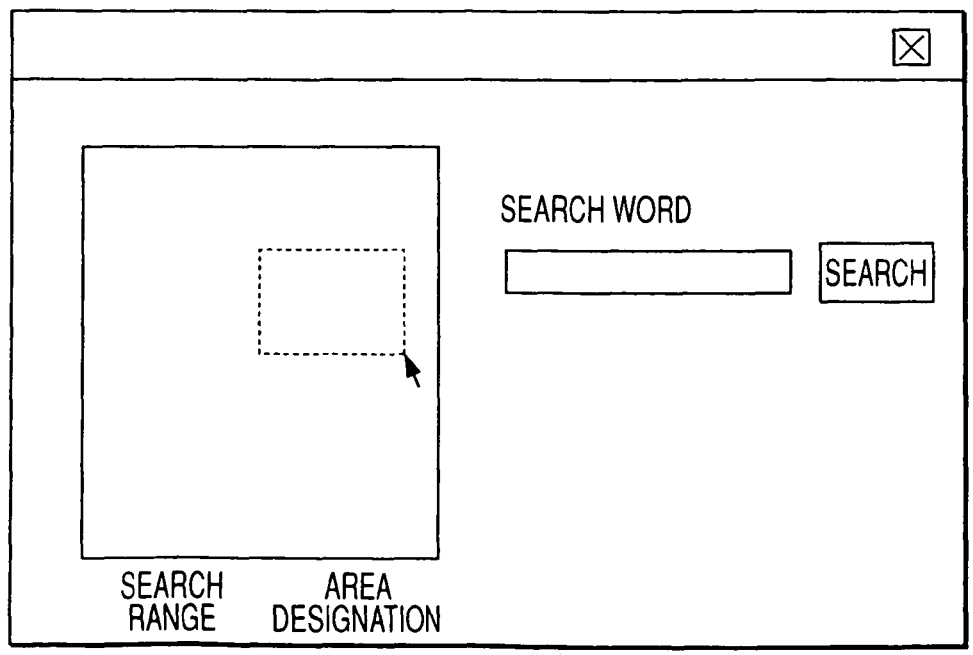
FIG. 4 is an explanatory diagram showing examples of the word fundamental information and the word position information generated by the history control apparatus according to the embodiment of the invention.
FIG. 5 is an explanatory diagram showing an example of the interface screen for the search instruction, provided by the history control apparatus according to the embodiment of the invention.

The word position information generating section 23 generates word fundamental information including information representing how many times the word appears associated with every word, and also generates the word position information having the position information associated with every word and representing the position in the image data where the word is included. Here, the word fundamental information and the word position information are as shown in FIG. 4, for example.

The history information recording section 24 obtains information regarding the date and time when the process is executed from a calendar section (which can be realized with a calendar IC or the like) not shown, and stores in the storage section 13 the image data, the word fundamental information and the word position information associated with the image data, the keyword information together with the date and time information obtained here and the user information included in the additional information so as to be associated with each other as the history information.

The search processing section 25 performs search of the history information in accordance with search conditions designated by the user. In the present embodiment, the search conditions are received from the personal computer (PC) connected via the network, for example. And, the search result is sent back to the PC, which is the source of the search request, via the network.

The search condition obtained in the present embodiment includes a word and information for designating the appearance position of the word. As shown in FIG. 5, in response to the search request from, for example, the PC side, the search processing section 25 makes the request source PC display an interface screen including an interface (area designating section) for requiring designation of the search range and an interface (search word input section) for requiring input of the search word. The interface screen can be implemented using a typical technology such as Java capable of displaying a web screen and receiving an input from the user.

When the user draws an area in the area designating section by, for example, using a pointing device such as a mouse, inputs a word, which is the object of the search, to the search word input section, and clicks the "search" button, the control section 11 of the history control apparatus 1 receives the information (designated area information) of the area drawn by the user and the information of the word for search, and performs the following process as the process of the search processing section 25.

Namely, the search processing section 25 generates a list of the image data associated with the word designated as the search word with reference to the word fundamental information of each of the history information stored in the storage section 13 (S1) as shown in FIG. 6. And, the search processing section 25 selects, as the target data, one of the image data recited in the list generated in the step S1 and not yet selected as the target data (S2), and checks whether or not either of the areas designated by the word position information is included in the area designated by the designated area information with reference to the word position information of the search word associated with the target data (S3). At this moment, if none of the areas designated by the word position information is included in the area designated by the designated area information, the search processing section 25 removes the target data from the list (S4), and checks whether or not the image data not yet selected as the target data is included in the list (S5). At this moment, if the image data not yet selected as the target data is included in the list, then the process goes back to the step S2 and continues therefrom.

Further, if none of the image data not yet selected as the target data is included in the list (i.e., the process is completed for all of the image data in the list) in the step S5, the search processing section 25 generates information for presenting the list of the image data, and sends it to the PC, which is the source of the search request (S6).

Meanwhile, in the step S3, either of the areas designated by the word position information is included in the area designated by the designated area information, the process directly proceeds to the step S5.

Note that in the process of the step S3, if the designated area information is defined as a rectangle, the judgment is made based on whether or not the whole of the rectangular area (including any divisional rectangular areas) designated by the word position information is entirely included in the rectangle designated by the designated area information. Namely, the search processing section 25 sequentially reads out the area information associated with the target data and included in the word position information of the search word. And, if the flag representing that the area is the divisional area is not associated with the present area information, the search processing section 25 checks whether or not the rectangular area defined by the present area information thus read out is entirely included in the rectangle designated by the designated area information. Further, if the flag representing the divisional area is associated with the area information read out from the word position information, the search processing section 25 checks whether or not the rectangular area defined by the present area information is entirely included in the rectangle designated by the designated area information, and in addition, reads out the succeeding divisional area information recorded continuously, and then checks whether or not the rectangular area defined by the succeeding area information is entirely included in the rectangle designated by the designated area information. And, if the all of the divisional rectangular areas are entirely included in the rectangle designated by the designated area information, the search processing section 25 judges that the rectangular area is included in the area specified by the designated area information.

Note that, although in the above explanation, the example is described in which the word information obtained by the morphological analysis method or the N-gram method is extracted as the search object, the information representing an area where each character is formed can alternatively be generated not for each word but for each character, recorded as character position information, and provided to the search process. In this case, it is enough to record the character string information and coordinate information representing the area in which each character is formed as the character position information. And, the search processing section 25 searches the search word from the character string information of the target data, and checks, for every section specified by the present search, whether or not all of the character forming areas corresponding to the characters included in the specified section are entirely included in the area designated by the designated area information. And, if all of the character forming areas corresponding to the characters included in the specified section are entirely included in the area designated by the designated area information, the search processing section 25 keeps the target data in the list of the search result. Further, if at least a part of the character forming areas corresponding to the characters included in the specified section is positioned outside the area designated by the designated area information with respect to all of the sections specified by the present search, the search processing section 25 remove the target data from the list of the search result.

Figure 7A:
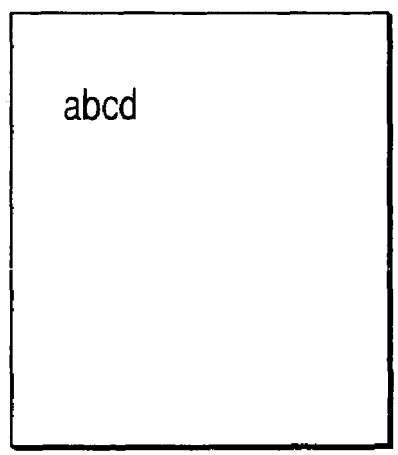
FIGS. 7A to 7C is an explanatory diagram of an operational example of the history control apparatus according to the embodiment of the invention.
Figure 7B:
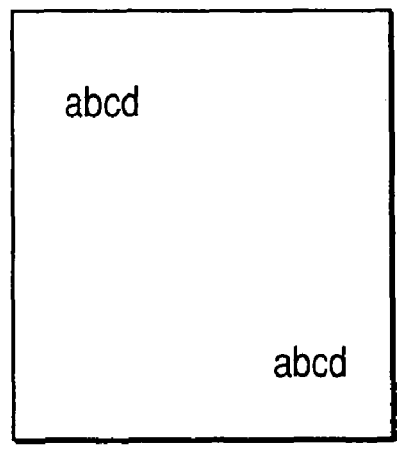
Figure 7C:
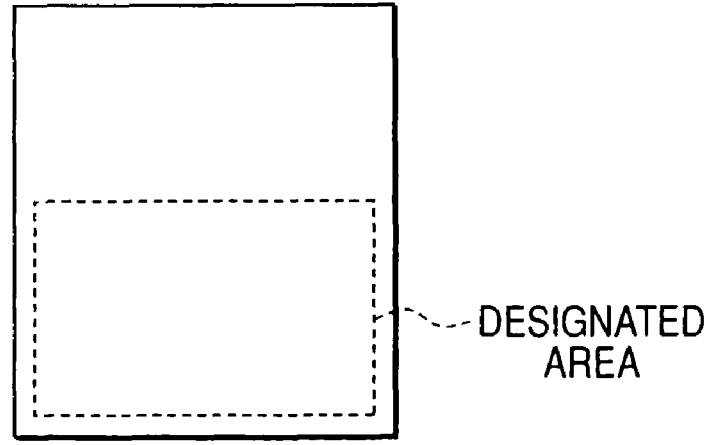

An example of an operation of the history control apparatus 1 according to the present embodiment will now be described. Here, for example, as shown in FIG. 7, it is assumed that a document A (see FIG. 7A) with a character string "abcd" described only on the upper half of the sheet and a document B (see FIG. 7B) with a character string "abcd" described on both the upper half and the lower half of the sheet are prepared, and are respectively copied by the copy machine 2.

In the copying process, the information regarding the date and time, the user name and so on, the word fundamental information regarding the character string of "abcd", and the word position information representing the position of the character string are recorded in the history control apparatus 1 together with the image data of the document A associated with each other while copying the document A. Note here that the word position information only includes the area information in the upper half of the sheet.

Further, the information regarding the date and time, the user name and so on, the word fundamental information regarding the character string of "abcd", and the word position information representing the position of the character string are recorded therein together with the image data of the document B associated with each other while copying the document B. In this case, the word position information includes area information regarding the upper half of the sheet and the lower half of the sheet.

In the case in which the user conducts a search of the image data including the character string of "abcd" in the lower half thereof, the user draws a rectangle surrounding the lower half of the sheet (see FIG. 7C) in the area designating section of the interface screen for performing the search instruction for setting the lower half of the sheet as the designated area of the search range, and inputs the character string of "abcd" as the search word.

In response to the designation of these search conditions, the history control apparatus 1 searches the image data associated with the character string "abcd" designated as the search word. Here, as described above, the image data of the document A and the image data of the document B are found out, and then included in the list.

And, the history control apparatus 1 refers to the word position information of the search word with respect to each of the image data included in the list. Firstly, in the image data of the document A, the area information in the upper half of the sheet is found out due to the word position information of the search word "abcd." However, since the area specified by this area information is not included in the area designated as the search range, the image data of the document A is removed from the list.

Subsequently, regarding the image data of the document B, the area information in the upper half of the sheet is also not included in the area designated as the search range, but the area information in the lower half of the sheet is included in the designated area. Therefore, the image data of the document B is not removed from the list but included in the search result to be displayed.

Note that in the explanation so far, the history control apparatus 1 is explained as the device separated from the image processing apparatus such as the copy machine 2 or the printer 3, but can be configured integrally with such image processing apparatus. In such a case, the history information of the image data, which was the object of the process, is stored in each of the image processing apparatus.

The entire disclosure of Japanese Patent Application No. 2005-368118 filed on Dec. 21, 2005 including specification, claims, drawings and abstract is incorporated herein by reference in its entirety.

What is claimed is:

1. A history management apparatus comprising:
   a detection unit that detects a character or a word included in image data which is processed in an image processing apparatus; and a storage unit that stores information to specify a detection position of the detected character or word in the image data and the image data in association with each other, wherein a detecting area including the detection position of the detected character or the word in the image data and the image data in association with each other is determined by a user inputted drawn rectangle, and the stored information is provided to an image data searching process using the character or the word and the detecting area as search conditions.

2. The history management apparatus of claim 1, further comprising:

a judgment unit to decide whether the detecting position of the character or the word is in a predetermined area.

3. The history management apparatus of claim 1, wherein the detection unit detects positional information of the character or the word as rectangular areas in each of lines, the detection unit detects the rectangular areas which are divided in each of the lines if the word spans more than one line, and at least one of the divided rectangular areas is associated with information representing that the rectangular areas are divided.

4. The history management apparatus of claim 1, wherein information of the detecting area is applied to each page of the image data when the image data includes a plurality of pages.

5. A method of managing a history using a computer comprising:

detecting a character or a word included in image data which is processed in an image processing apparatus; and storing information to specify a detection position of the detected character or word in the image data and the image data in association with each other, wherein a detecting area including the detection position of the detected character or the word in the image data and the image data in association with each other is determined by a user inputted drawn rectangle and the stored information is provided to an image data searching process using the character or the word and the detecting area as search conditions.

6. The method of claim 5, wherein the stored information is provided to the image data searching process using the character or the word and a detecting area relating to the detecting position as search conditions.

7. The method of claim 5, further comprising:

deciding whether the detecting position of the character or the word is in a predetermined area.

8. A non-transitory storage medium readable by a computer, the storage medium storing a program of instructions executable by the computer to perform a function for controlling a history, the function comprising:

detecting a character or a word included in image data which is processed in an image processing apparatus; and storing information to specify a detection position of the detected character or word in the image data and the image data in association with each other, wherein a detecting area including the detection position of the detected character or the word in the image data and the image data in association with each other is determined by a user inputted drawn rectangle, and the stored information is provided to an image data searching process using the character or the word and the detecting area as search conditions.

9. The storage medium of claim 8, wherein the stored information is provided to the image data searching process using the character or the word and a detecting area relating to the detecting position as search conditions.

10. The storage medium of claim 8, the program further comprising:

deciding whether the detecting position of the character or the word is in a predetermined area.

* * * * *